May 29, 1923.

J. C. VOIGT

WATER CIRCULATING MACHINE RUN BY THE FAN BELT FOR GASOLINE
ENGINES ON AUTOMOBILES

Filed June 24, 1921

1,456,684

Inventor.
Joseph Carl Voigt

Patented May 29, 1923.

1,456,684

UNITED STATES PATENT OFFICE.

JOSEPH CARL VOIGT, OF LOS ANGELES, CALIFORNIA.

WATER-CIRCULATING MACHINE RUN BY THE FAN BELT FOR GASOLINE ENGINES ON AUTOMOBILES.

Application filed June 24, 1921. Serial No. 480,188.

*To all whom it may concern:*

Be it known that I, JOSEPH CARL VOIGT, a citizen of the United States, residing at Los Angeles, in the county of Los Angeles and State of California, have invented a new and useful Water-Circulating Machine Run by the Fan Belt for Gasoline Engines on Automobiles, of which the following is a specification.

My invention relates to a cooling water circulator for an internal combustion engine by means of a housing that takes the place of the outlet connection pipe, an impeller mounted upon the shaft within the said housing, and a grooved pulley mounted upon the same shaft outside the said housing. The grooved pulley receives its revolving power from the edge of the fan belt when the fan belt is in motion. The circulator forces the water through the said housing over the cylinders, in and through the radiator, to be circulated for the purpose of keeping the engine from getting overheated.

Figure 1:
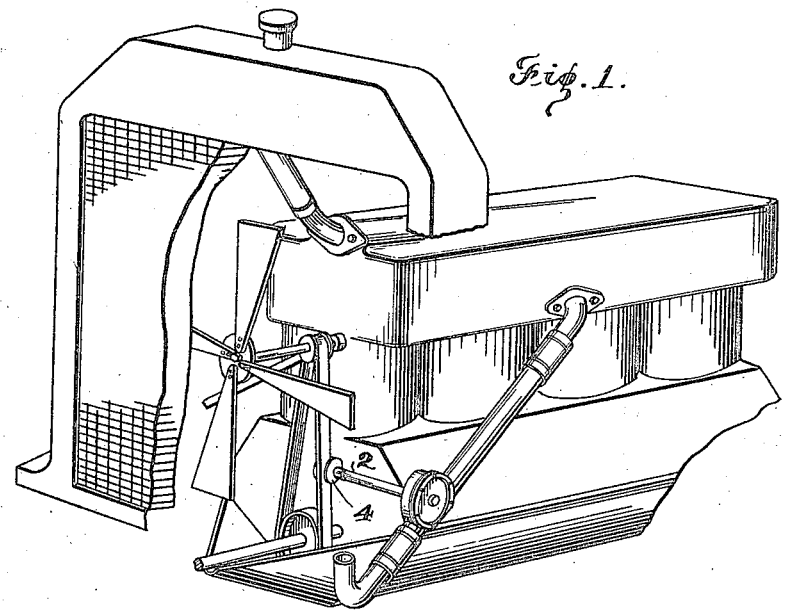

Fig. 1 shows the water circulator, a semi-circle and pipe shape housing that takes the place of the outlet connection pipe in position, which is fastened to the radiator outlet connection pipe by hose and hose clips and fastened to the cylinder inlet connection by hose and hose clips, 4 is the grooved pulley; 2 is the shaft; 3 is the four paddle metal casting shown in dotted lines; 1 is the removable cover. 2, 3 and 4 are as one solid figure, and driven by the edge of the fan belt by 4, the grooved pulley, when in motion revolving in the hubs on the housing. The paddles incased in housing force the water through the long pipe shape housing over the cylinders, in and through the radiator, back into the short pipe shape housing to be forced around again by the circulating machine, making a continuous circulation of water.

Figure 2:
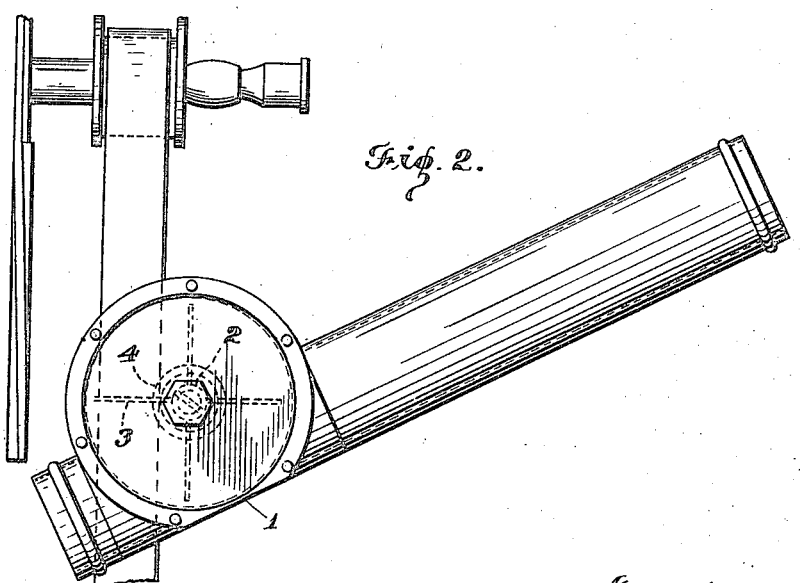

Fig. 2 is the housing that takes the place of the outlet connection pipe; 1 is the removable cover that is fastened on with screws; 2 is the shaft; 3 is the four paddles mounted on the shaft; 4 is the grooved pulley that is also mounted on the shaft. 4, 3 and 2 are assembled and shown by dotted lines in Fig. 2.

Fig. 2 shown with a part of the fan belt is a semi-circle and pipe shape housing having a removable cover. 2, 3 and 4 shown in dotted lines are as one solid figure, and driven by the edge of the fan belt by 4, the grooved pulley, when in motion revolving in the hubs on the housing. The paddles incased in housing force the water through the long pipe shape housing over the cylinders, in and through the radiator, back into the short pipe shape housing to be forced around again by the circulating machine, making a continuous circulation of water.

This housing with machine takes the place of the outlet connection pipe, and is fastened in position at the lower end to radiator outlet connection by hose and hose clips. The upper end is also fastened by hose and hose clips to the cylinder inlet connection. The bearings of this machine are lubricated by grease in the hub caps and oil through the hubs.

I claim—

In an internal combustion engine having a cylinder block, a water jacket therefor, a radiator, connections between the radiator and the water jacket, and a belt-driven fan for drawing air through the radiator, a cooling water circulator comprising a casing inserted in the inlet to the water jacket of the engine, a shaft extending into the casing and perpendicular to the plane of the cylinder block, an impeller mounted upon the shaft within the casing, and a pulley mounted upon the shaft outside the casing and adapted to be engaged and driven by the edge of the fan belt.

JOSEPH CARL VOIGT.